United States Patent
Iasi et al.

(10) Patent No.: US 10,165,050 B2
(45) Date of Patent: Dec. 25, 2018

(54) SYSTEMS AND METHODS FOR DIFFRACTED DATA RETRIEVAL

(71) Applicant: FHOOSH, INC., La Jolla, CA (US)

(72) Inventors: Anthony Iasi, San Diego, CA (US); Linda Eigner, La Jolla, CA (US); William Eigner, La Jolla, CA (US); Charles Kahle, Escondido, CA (US); Eric Tobias, La Jolla, CA (US)

(73) Assignee: FHOOSH, INC., San Diego, CA (US)

( * ) Notice: Subject to any disclaimer, the term of this patent is extended or adjusted under 35 U.S.C. 154(b) by 120 days.

(21) Appl. No.: 14/970,466

(22) Filed: Dec. 15, 2015

(65) Prior Publication Data

US 2016/0173605 A1    Jun. 16, 2016

Related U.S. Application Data

(60) Provisional application No. 62/092,227, filed on Dec. 15, 2014.

(51) Int. Cl.
*H04L 29/08* (2006.01)

(52) U.S. Cl.
CPC .......... *H04L 67/1097* (2013.01); *H04L 67/06* (2013.01)

(58) Field of Classification Search
CPC ... G06Q 10/10; H04L 29/06; H04L 29/08072; H04L 29/06027; H04L 12/581; G06F 11/1451; G06F 11/1458; G06F 11/1464; G06F 11/1469; G06F 11/1456
USPC ........................................................ 709/204
See application file for complete search history.

(56) References Cited

U.S. PATENT DOCUMENTS

| | | |
|---|---|---|
| 6,088,700 A | 7/2000 | Larsen et al. |
| 7,092,952 B1 | 8/2006 | Wilens |
| 7,334,184 B1 | 2/2008 | Simons |
| 8,019,664 B1 | 9/2011 | Tifford et al. |
| (Continued) | | |

FOREIGN PATENT DOCUMENTS

| | | |
|---|---|---|
| EP | 1522947 A2 | 4/2005 |
| GB | 2514428 A | 11/2014 |

OTHER PUBLICATIONS

International Search Report and Written Opinion for PCT/US2015/065911 dated Mar. 30, 2016 (16 pages).

(Continued)

*Primary Examiner* — Mahran Y Abu Roumi
(74) *Attorney, Agent, or Firm* — Procopio, Cory, Hargreaves & Savitch LLP

(57) ABSTRACT

A system for diffracted data retrieval (DDR) comprises a plurality of storage locations. The system for DDR also comprises a client device configured to: transmit a request to retrieve the data object, wherein the data object comprises a plurality of segments stored across the plurality of storage locations; receive a sequencing key in response to the request to retrieve the data object; and retrieve the plurality of segments of the data object from the plurality of storage locations based at least in part on an order indicated by the sequencing key. The system of DDR further comprises an initiation server configured to: receive the request from the client device to retrieve the data object; generate the sequencing key in response to the request; transmit the sequencing key to the client device; and monitor a progress of the retrieval of the data object by the client device.

22 Claims, 7 Drawing Sheets

(56) References Cited

U.S. PATENT DOCUMENTS

| | | |
|---|---|---|
| 8,260,806 B2 | 9/2012 | Steele et al. |
| 8,386,706 B2 | 2/2013 | Koeppe et al. |
| 8,407,224 B2 * | 3/2013 | Bach ................. G06F 17/30743 380/1 |
| 8,782,437 B2 | 7/2014 | Rashkovskiy et al. |
| 2001/0047381 A1 | 11/2001 | Meno et al. |
| 2002/0062342 A1 | 5/2002 | Sidles |
| 2002/0111888 A1 | 8/2002 | Stanley et al. |
| 2003/0204602 A1 | 10/2003 | Hudson et al. |
| 2007/0208665 A1 | 9/2007 | Ohara |
| 2008/0022012 A1 | 1/2008 | Wang |
| 2008/0155664 A1 * | 6/2008 | Lieber .................. H04L 63/061 726/5 |
| 2009/0030910 A1 | 1/2009 | Bennett et al. |
| 2009/0254971 A1 * | 10/2009 | Herz ..................... G06Q 10/10 726/1 |
| 2010/0245938 A1 | 9/2010 | Coley et al. |
| 2010/0274590 A1 | 10/2010 | Compangano et al. |
| 2011/0093471 A1 | 4/2011 | Brockway et al. |
| 2011/0191114 A1 | 8/2011 | Bhagwan et al. |
| 2011/0289010 A1 | 11/2011 | Rankin, Jr. et al. |
| 2012/0331088 A1 * | 12/2012 | O'Hare ............... G06F 21/6227 709/214 |
| 2013/0173553 A1 * | 7/2013 | Apte ........................ G06F 7/00 707/640 |
| 2013/0290648 A1 | 10/2013 | Shao et al. |
| 2014/0201824 A1 * | 7/2014 | Agbabian ........... G06F 21/6245 726/6 |
| 2015/0121063 A1 * | 4/2015 | Maller ................ H04L 63/0435 713/153 |

OTHER PUBLICATIONS

Lasertiche, Quick Fields, Extract Value From Your Information, Compulink Management Center, Inc. 2009, 11 pages.

Supplementary Partial European Search Report for related European Patent Application No. 15870918, dated May 11, 2018, 17 pages.

Extended European Search Report for related European Patent Application No. 15870918.8 dated Aug. 17, 2018; 18 pages.

* cited by examiner

SYSTEMS AND METHODS FOR DIFFRACTED DATA RETRIEVAL

RELATED APPLICATION INFORMATION

This application claims the benefit under 35 U.S.C. § 119(e) to U.S. Provisional Patent Application No. 62/092,227, filed on Dec. 15, 2014, the disclosure of which is incorporated herein by reference in its entirety. This application is related to U.S. patent application Ser. No. 14/863,294, filed on Sep. 23, 2015, the disclosure of which is incorporated herein by reference in its entirety.

BACKGROUND

1. Technical Field

Various embodiments described herein relate generally to the field of electronic data security and more particularly to diffracted retrieval of data from multiple storage locations.

2. Related Art

Electronic storage of information is now ubiquitous in modern society. Almost every conceivable type of information is now stored in electronic format, and will at some point be transmitted across a network from one data storage location to another. A great deal of this information is confidential and sensitive information that must be securely transmitted and stored, be it personal financial information, classified government research or confidential corporate documents. The challenge for secure transmission and storage of electronic data is that securing the data must be balanced with the accessibility of the data. In other words, the data cannot be secured to the point that it is too difficult to obtain when it is needed.

Typical data security options either protect a location where data is stored (through firewalls, passcodes, etc.) or protect the data during its transmission (through encryption, for example). Both methods are susceptible in that a bad actor need only penetrate a single security protocol to obtain access to all of the data being stored at the location, or all of the data being transmitted during a transmission session. In a standard secure client-server communication model, transfer of a data trove can be unlimited once the connection has been authenticated and authorized. Thus, a majority of electronic data remains vulnerable to unauthorized intrusions that compromise an entire set of data being transmitted during a session or stored at a particular location.

Thus, what is needed is a system and method for secure storage and transmission of electronic data.

SUMMARY

Systems and methods for diffracted data retrieval (DDR) are disclosed. According to the systems and methods for DDR disclosed herein, request and delivery of a data object is diffracted across multiple storage locations. Accordingly, the data object is decomposed into a plurality of segments, which are stored across a plurality of storage locations. Attempts to retrieve individual segments of the data object require separate, sequential validations. The failure to validate the retrieval of any one segment of the data object from a storage location may prevent the retrieval of the remaining segments of the data object. Advantageously, DDR may eliminate a mass security breach as a client device is unable to retrieve a data object in its entirety through a single request and from a single storage location. Instead, the client device is required to execute multiple, separately validated requests across multiple storage locations in order to retrieve a single data object.

According to various embodiments, there is provided a method for retrieving a data object. In some embodiments, the method includes: transmitting from a client device to an initiation server a request to retrieve the data object, wherein the data object comprises a plurality of segments stored across a plurality of storage locations; receiving, at the client device, a sequencing key from the initiation server in response to the request to retrieve the data object, wherein the sequencing key comprises an ordered list of the plurality of storage locations; and retrieving, by the client device, the plurality of segments of the data object from the plurality of storage locations based at least in part on an order indicated by the sequencing key.

According to various embodiments, there is provided a method for providing a data object. In some embodiments, the method includes: receiving, at an initiation server, a request from a client device to retrieve a data object; generating a sequencing key in response to the request from the client device to retrieve the data object, wherein the sequencing key comprises an ordered list of the plurality of storage locations; transmitting the sequencing key to the client device; receiving a notification from a first of the plurality of storage locations of an attempt by the client device to retrieve a first segment of the data object; determining whether the request to retrieve the first segment of the data object from the first storage location is in the order indicated by the sequencing key; and invalidating a session with the client device in response to determining that the request to retrieve the first segment of the data object from the first storage location is not in the order indicated by the sequencing key.

According to various embodiments, there is provided a method for providing a data object. In some embodiments, the method includes: receiving, at a first of a plurality of storage locations, a request from a client device to retrieve a first of a plurality of segments of a data object, wherein the data object comprises the plurality of segments stored across the plurality of storage locations; transmitting, to an initiation server, a notification of the attempt by the client device to retrieve the first segment of the data object; determining whether a verification of the request is received from the initiation server; and in response to determining that a verification of the request is received from the initiation server: verifying an access key provided by the client device; and providing the first segment of the data object to the client device in response to successfully verifying the access key provided by the client device.

According to various embodiments, there is provided a system for DDR. The system may include plurality of storage locations, a client device, and an initiation server.

In some embodiments, the client device may be configured to: transmit a request to retrieve a data object, wherein the data object comprises a plurality of segments stored across the plurality of storage locations; receive a sequencing key in response to the request to retrieve the data object, wherein the sequencing key comprises an ordered list of the plurality of storage locations; and retrieve the plurality of segments of the data object from the plurality of storage locations based at least in part on an order indicated by the sequencing key.

In some embodiments, the initiation server may be configured to: receive the request from the client device to retrieve the data object; generate the sequencing key in response to the request from the client device to retrieve the data object; transmit the sequencing key to the client device; and monitor a progress of the retrieval of the data object by the client device.

Other features and advantages should become apparent from the following description of the preferred embodiments, taken in conjunction with the accompanying drawings.

BRIEF DESCRIPTION OF THE DRAWINGS

Various embodiments disclosed herein are described in detail with reference to the following figures. The drawings are provided for purposes of illustration only and merely depict typical or exemplary embodiments. These drawings are provided to facilitate the reader's understanding and shall not be considered limiting of the breadth, scope, or applicability of the embodiments. It should be noted that for clarity and ease of illustration these drawings are not necessarily made to scale.

The various embodiments mentioned above are described in further detail with reference to the aforementioned figured and the following detailed description of exemplary embodiments.

DETAILED DESCRIPTION

Certain embodiments disclosed herein provide methods and systems for secure storage, access, and transmission of electronic data. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
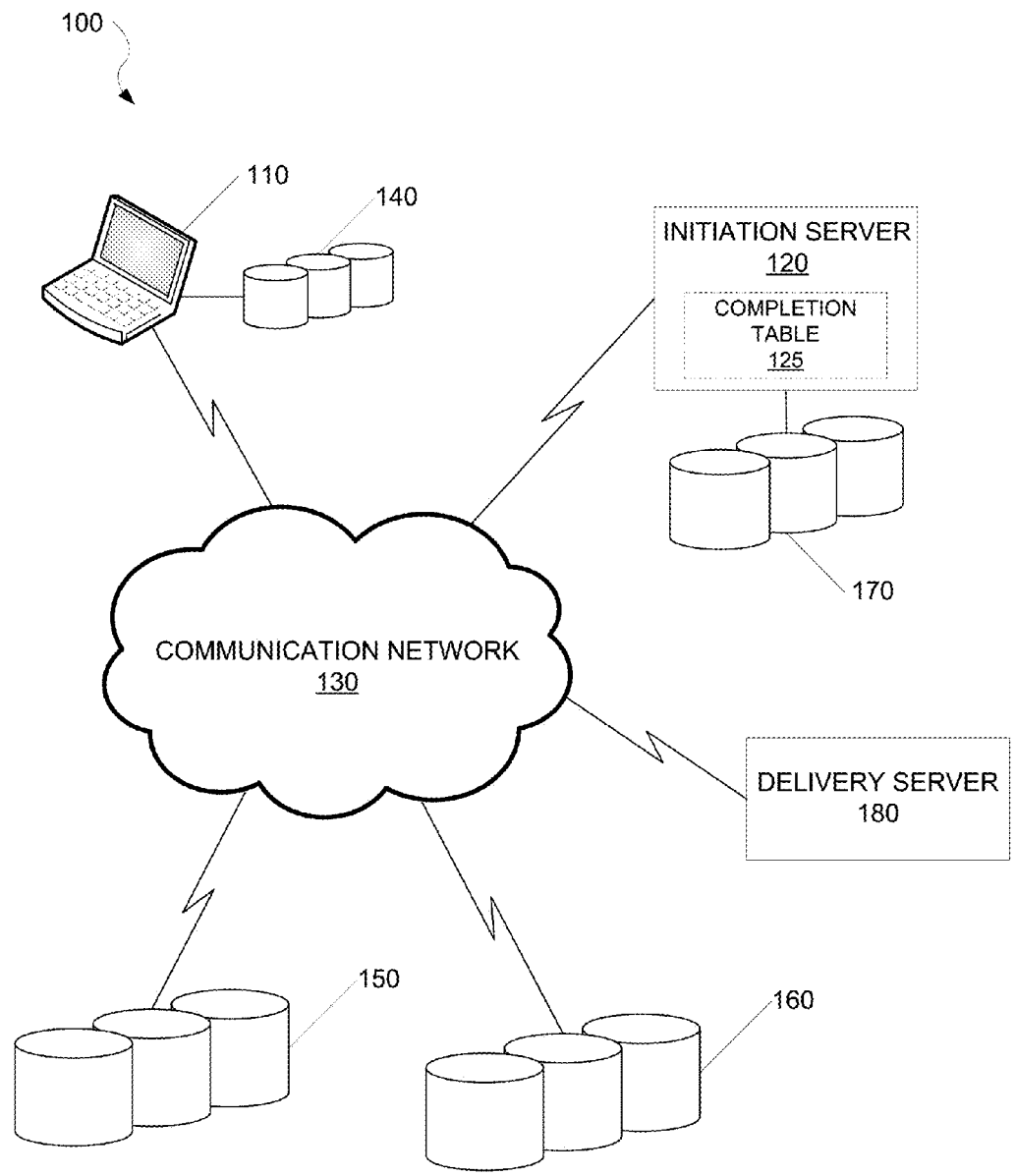
FIG. 1 is a network diagram illustrating a network environment according to various embodiments.

FIG. 1 is a network diagram illustrating a network environment 100 according to various embodiments. Referring to FIG. 1, in various embodiments, a client device 110 communicates with an initiation server 120. The client device 110 can be any device that is capable of communication with or causing communication with the initiation server 120 through a wired or a wireless connection. For example, the client device 110 may be a wired or wireless communication device including, for example, but not limited to, a smartphone, a wearable device, a tablet personal computer (PC), a laptop, a desktop PC, a personal entertainment system, and an embedded processing system.

The client device 110 may communicate with the initiation server 120 via a communication network 130. In various embodiments, the communication network 130 represents one or more wired and/or wireless connections. For example, the communication network 130 may include, for example, but not limited to, a wired and/or wireless local area network (LAN), a wired and/or wireless wide area network (WAN), and any combinations thereof.

One or more features and functionalities of the initiation server 120 can be exposed via a user interface (UI). In one embodiment, one or more features and functionalities of the initiation server 120 may be accessed on the client device 110 via a mobile and/or web application. For example, during a secure session, the client device 110 may transmit a request to retrieve a data object to the initiation server 120 by inputting, selecting, or otherwise invoking a getData( ) command through the UI provided via the client device 110. It is to be understood that references to the data object throughout the present disclosure extends to any metadata that is associated with the data object. As such, any operation that is performed with respect to the data object (e.g., retrieving the data object) may performed with respect to the data object and/or metadata associated with the data object.

The initiation server 120 is configured to receive and process the request to retrieve the data object. The data object may have been decomposed into a plurality of segments and stored across a plurality of storage locations including, for example, but not limited to, a first data store 140, a second data store 150, a third data store 160, and a fourth data store 170. In some embodiments, the initiation server 120 may decompose the data object and distribute segments of the data object across the plurality of storage locations when the request to retrieve the data object is received at the initiation server 120. Storage and retrieval of data objects that are decomposed into a plurality of segments and distributed across multiple storage locations are described in U.S. patent application Ser. No. 14/863,294, the disclosure of which is incorporated herein by reference in its entirety.

A person having ordinary skill in the art can appreciate that segments of the data object may be stored in a different number of storage locations without departing from the scope of the present inventive concept. For example, the number of storage locations used to store segments of the data object may vary based on one or more factors including, for example, but not limited to, a size of the data object, a complexity of the data object, and a number of segments associated with the data object.

In various embodiments, segments of the data object may have been stored across multiple local and/or remote storage locations. In some embodiments, the initiation server 120 may decompose the data object and distribute segments of the data object for storage across a plurality of local and/or remote storage locations upon receiving the request to retrieve the data object from the client device 110. For example, the first data store 140 may be a local data store with respect to the client device 110 including, for example, but not limited to, an internal hard drive, a portal storage device (e.g., a universal serial bus (USB) flash drive, external hard drive), and any combination thereof. The second data store 150, the third data store 160, and the fourth data store 170 may be each be a remote data store (i.e., with respect to the client device 110) including, for example, but not limited to, one or more databases (e.g., MongoDB®), cloud storage, and any combination thereof. The second data store 150, the third data store 160, and the fourth data store 170 can each be a proprietary data store (i.e., directly associated with the initiation server 120), or be associated with one or more third-party file hosting services (e.g., Amazon® Simple Storage Service (S3), Dropbox®) and/or storage as a service (STaaS) providers. The client device 110 can communicate with the second data store 150, the third data store 160, and the fourth data store 170 (e.g., to retrieve segments of the data object) via the communication network 130.

In response to the request from the client device 110, the initiation server 120 generates a sequencing key that includes an ordered list of individual identifiers corresponding to each of the storage location at which segments of the data object are stored. The initiation server 120 stores the sequencing key or a copy of the sequencing key (e.g., in the completion table 125 or in the fourth data store 170). The initiation server 120 further transmits the sequencing key or a copy of the sequencing key to the client device 110. The client device 110 retrieves the segments of the data object from each storage location based on the sequencing key and a diffraction table. According to one exemplary embodiment, in order to successfully retrieve the data object, the client device 110 is required to retrieve segments of the data object from each storage location in the order indicated by the sequencing key.

The initiation server 120 is further configured to monitor the progress of the data retrieval by the client device 110. In one exemplary embodiment, each storage location is configured to verify requests from the client device 110 to retrieve one or more segments of the data object. For example, in response to receiving a request from the client device 110 to retrieve one or more segments of the data object, the second data store 150 may transmit a notification to the initiation server 120. The initiation server 120 determines whether the request to the second data store 150 is in the correct order indicated by the sequencing key. According to one exemplary embodiment, the initiation server 120 is configured to invalidate the current session with the client device 110 in response to determining that the request to retrieve data from the second data store 150 is not in the correct order indicated by the sequencing key.

In order to successfully retrieve one or more segments of the data object from a storage location, the client device 110 is further configured to provide a correct access key associated with the storage location. For example, the client device 110 may provide the access key associated with the second data store 150 when requesting to retrieve one or more segments of the data object from the second data store 150. In various embodiments, the second data store 150 verifies the access key provided by the client device 110. In the event that the access key provided by the client device 110 is incorrect, the second data store 150 can alert the initiation server 120. As a result, the initiation server 120 can invalidate the current session with the client device 110.

In some embodiments, the client device 110 may retrieve one or more segments of the data object directly from a storage location. Alternately or in addition, the client device 110 may retrieve one or more segments of the data object via a delivery server. For example, the client device 110 may retrieve one or more segments of the data object directly from the second data store 150 by transmitting a request to the second data store 150. Alternately, a delivery server 180 may intercept the request from the client device 110. The delivery server 180 may retrieve the segments of the data object from the second data store 150 and provide the segments of the data object to the client device 110. According to one exemplary embodiment, the operations of a delivery server (e.g., the delivery server 180) as an intermediary are transparent to the client device 110.

FIG. 2A illustrates a sequencing key 200 according to various embodiments. Referring to FIGS. 1 and 2A, the sequencing key 200 may include a plurality of data store identifiers including, for example, but not limited to, a first data store identifier 210, a second data store identifier 220, a third data store identifier 230, and a fourth data store identifier 240.

Each of the data store identifiers can be associated with a corresponding data store. For example, the first data store identifier 210 may be associated with the first data store 140, the second data store identifier 220 may be associated with the second data store 150, the third data store identifier 230 may be associated with the third data store 160, and the fourth data store identifier 240 may be associated with the fourth data store 170.

In one exemplary embodiment, the sequencing key 200 includes the plurality of data store identifiers in a specific order. For example, as shown in FIG. 2A, the sequencing key 200 indicates the following order: the first data store identifier 210, the second data store identifier 220, the third data store identifier 230, the second data store identifier 220, and the fourth data store identifier 240.

To successfully retrieve the data object, the client device 110 is required to retrieve segments of the data object from each storage location according to the order indicated by the sequencing key 200. For example, the client device 110 may retrieve one or more segments of the data object first from the first data store 140 associated with the first data store identifier 210 that appears first in the sequencing key 200. Next, the client device 110 may retrieve one or more segments of the data object from the second data store 150 associated with the second data store identifier 220 appearing next in the sequencing key 200. The client device 110 may subsequently retrieve one or more segments of the data object from the third data store 160, the second data store 150, and the fourth data store 170 as indicated by the order that the corresponding data store identifiers appears in the sequencing key 200.

It is to be understood that the client device 110 may retrieve any number of segments of the data object each time the client device 110 retrieves segments of the data object from a storage location. For example, a same or different number of segments of the data object may be stored at each storage location. A person having ordinary skill in the art can appreciate that the client device 110 may retrieve a fixed or a variable number of segments from each storage location without departing from the scope of the present disclosure.

FIG. 2B illustrates a diffraction table 250 according to various embodiments. Referring to FIGS. 1 and 2A-B, the diffraction table 250 includes connection information associated each storage location including, for example, but not limited to, a universal resource locator (URL), a port number, and an access key. According to one exemplary embodiment, in addition to a sequencing key (e.g., the sequencing key 200), the client device 110 can retrieve segments of the data object from the plurality of storage locations based on the diffraction table 250.

For example, the client device 110 may retrieve one or more segments of the data object from the first data store 140 based on the URL, the port number, and access key associated with the first data store identifier 210 of the first data store 140 as provided by the diffraction table 250. Similarly, the client device may retrieve one or more segments of the data object from the second data store 150 based on the URL, the port number, and access key associated with the second data store identifier 220 of the second data store 150 as provided by the diffraction table 250.

In one exemplary embodiment, in order to retrieve one or more segments of the data object from a data store, the client device 110 is required to provide a correct access key to the data store. Each storage location can authenticate the client device 110 based on the access key provided by the client device 110 when the client device 110 attempts to retrieve one or more segments of the data object from the data store. For example, the client device 110 is required to provide the access key associated with the first data store 140 in order to retrieve one or more segments of the data object from the first data store 140.

The access key associated with each storage location may be specific to each session between the client device 110 and the initiation server 120. For example, the access key associated with each storage location may be a hash key. In some embodiments, the access key associated with each storage location may be a salted hash key.

According to one exemplary embodiment, the access key associated with each storage location can be generated based on a credential token that is specific to each storage location. In addition, the access key associated with each storage location can be generated based on a separate credential token that is specific to the client device 110. For example, upon each successful login by the client device 110, the initiation server 120 can provide the client device 110 with the credential token. In some embodiments, the credential token associated with the client device 110 may be generated based on an internet protocol (IP) address of the client device 110 and a salt value. Alternately, the initiation server 120 can generate a random value for the credential token associated with the client device 110.

In various embodiments, the diffraction table 250 can be generated and provided by the initiation server 120. According to one exemplary embodiment, at least a portion of the connection information included in diffraction table 250 can be rotated based on a fixed schedule (e.g., daily). Alternately or in addition, at least a portion of the connection information included in the diffraction table 250 may be rotated dynamically (e.g., upon each login and/or detection of security risks). For example, the initiation server 120 may change at least some of the access keys included in the diffraction table 250 for each session between the client device 110 and the initiation server 120. Alternately or in addition, in some embodiments, the initiation server 120 can rotate the diffraction table 250 in response to an elevated security risk (e.g., detection of a security breach).

According to one exemplary embodiment, the diffraction table 250 can be specific to the client device 110. For instance, in some embodiments, the initiation server 120 can implement load balancing and/or prioritized access. As such, the initiation server 120 can impose one or more restrictions on the storage locations that may be accessed by the client device 110. Accordingly, the diffraction table 250 may selectively include (or omit) one or more storage locations such one or more segments of the data object retrieved by the client device 110 are stored in some but not all of the available storage locations.

Figure 2:
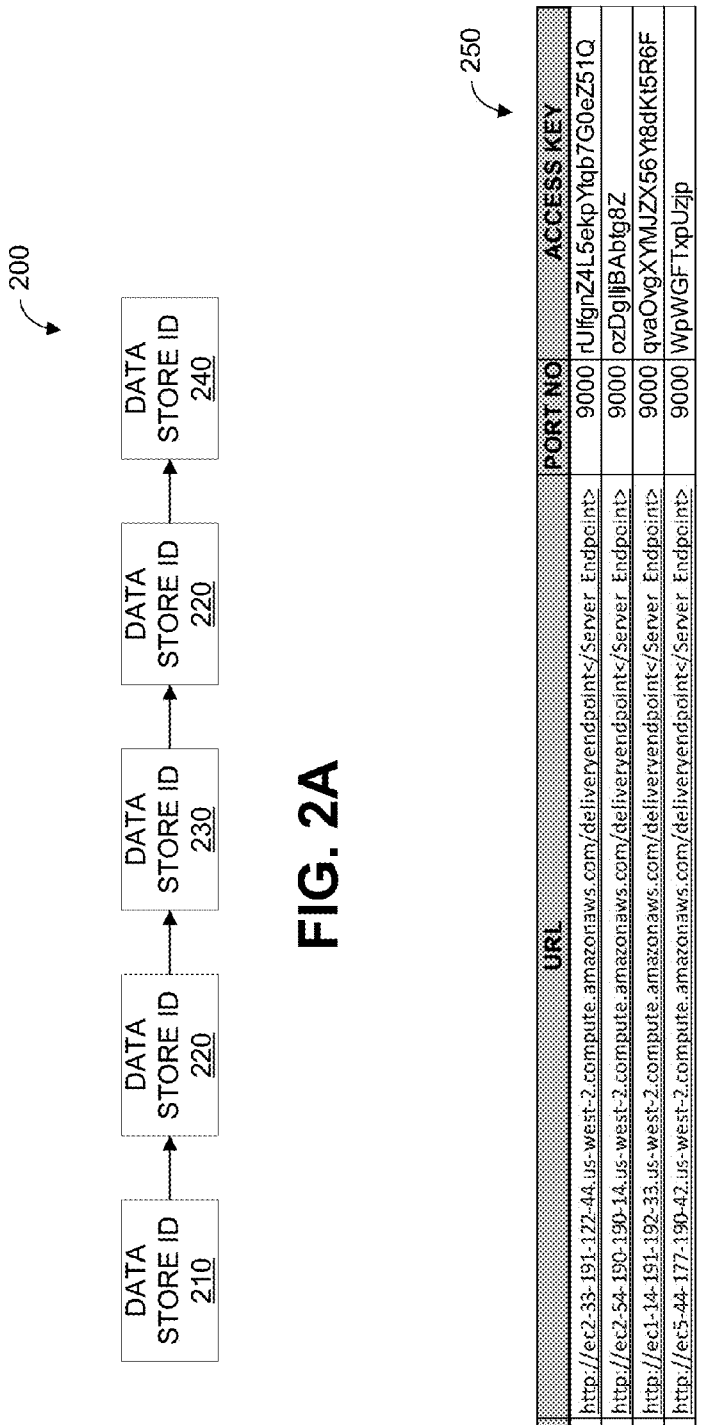
FIG. 2A illustrates a sequencing key according to various embodiments.
FIG. 2B illustrates a diffraction table according to various embodiments.
Figure 3:
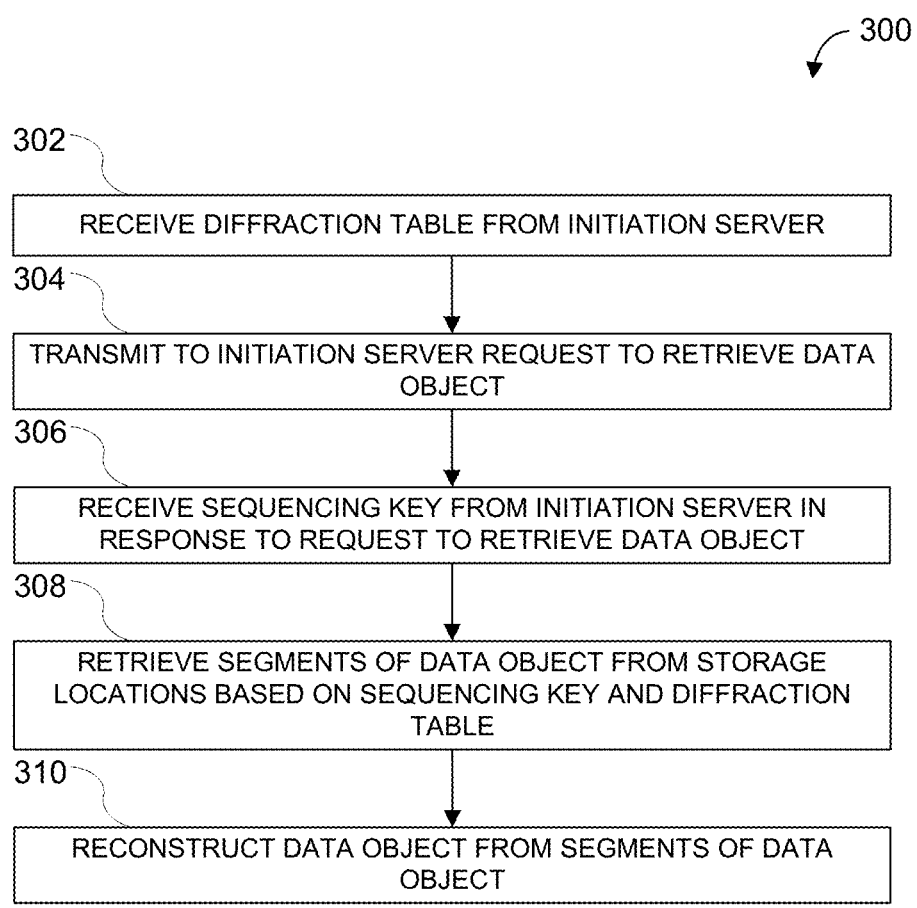
FIG. 3 is a flowchart illustrating a process for retrieving a data object according to various embodiments.

FIG. 3 is a flowchart illustrating a process 300 for retrieving a data object according to various embodiments. Referring to FIGS. 1-3, the process 300 can be performed by the client device 110.

The client device 110 receives the diffraction table 250 from the initiation server 120 (302). In various embodiments, client device 110 may receive the diffraction table 250 from the initiation server 120 upon each successful login. The diffraction table 250 includes connection information for one or more storage locations including, for example, but not limited to, an URL, a port number, and an access key associated with each storage location. According to one exemplary embodiment, the initiation server 120 can implement load balancing and/or prioritized access by selecting including (or omitting) one or more available storage locations from the diffraction table 250.

The client device 110 transmits to the initiation server 120 a request to retrieve a data object (304). In various embodiments, the client device 110 transmits a request to retrieve a data object that is decomposed into a plurality of segments and stored across a plurality of storage locations including, for example, but not limited to, the first data store 140, the second data store 150, the third data store 160, and the fourth data store 170. In some embodiments, the initiation server 120 can decompose data object into the plurality of segments and distribute the segments across a plurality of storage locations in response to the request from the client device 110.

The client device 110 receives a sequencing key from the initiation server 120 in response to the request to retrieve the data object (306). For example, according to one exemplary embodiment, the initiation server 120 generates the sequencing key 200 in response to the request from the client device 110. The sequencing key 200 includes an ordered list of storage locations (i.e., data store identifiers) at which segments of the data object are stored. For example, the sequencing key 200 may include the first data store identifier 210, the second data store identifier 220, the third data store identifier 230, the second data store identifier 220, and the fourth data store identifier 240.

The client device 110 retrieves segments of the data object from a plurality of storage locations based on the sequencing key and a diffraction table (308). The client device 110 reconstructs the data object from the segments of the data object (310). In one exemplary embodiment, the client device 110 retrieves segments of the data object from each of the plurality of storage locations at which segments of the data object are stored in an order specified by the sequencing key 200. For example, the client device 110 may retrieve one or more segments of the data object from the first data store 140 followed by the second data store 150, the third data store 160, the second data store 150, and the fourth data store 170. However, it is to be understood that the client device 110 may retrieve some segments of the data object concurrently from multiple storage locations without departing from the scope of the present disclosure.

Additionally, the client device 110 retrieves one or more segments of the data object from each storage location using the connection information (e.g., URL, port number, and access key) for each storage location as provided by the diffraction table 250. For instance, in order to retrieve one or more segments of the data object from the first data store 140, the client device 110 may be required to provide the access key associated with the first data store 140 as provided by the diffraction table 250.

A person having ordinary skill in the art can appreciate that one or more operations of the process 300 may be performed in a different order without departing from the scope of the present disclosure.

Figure 4:
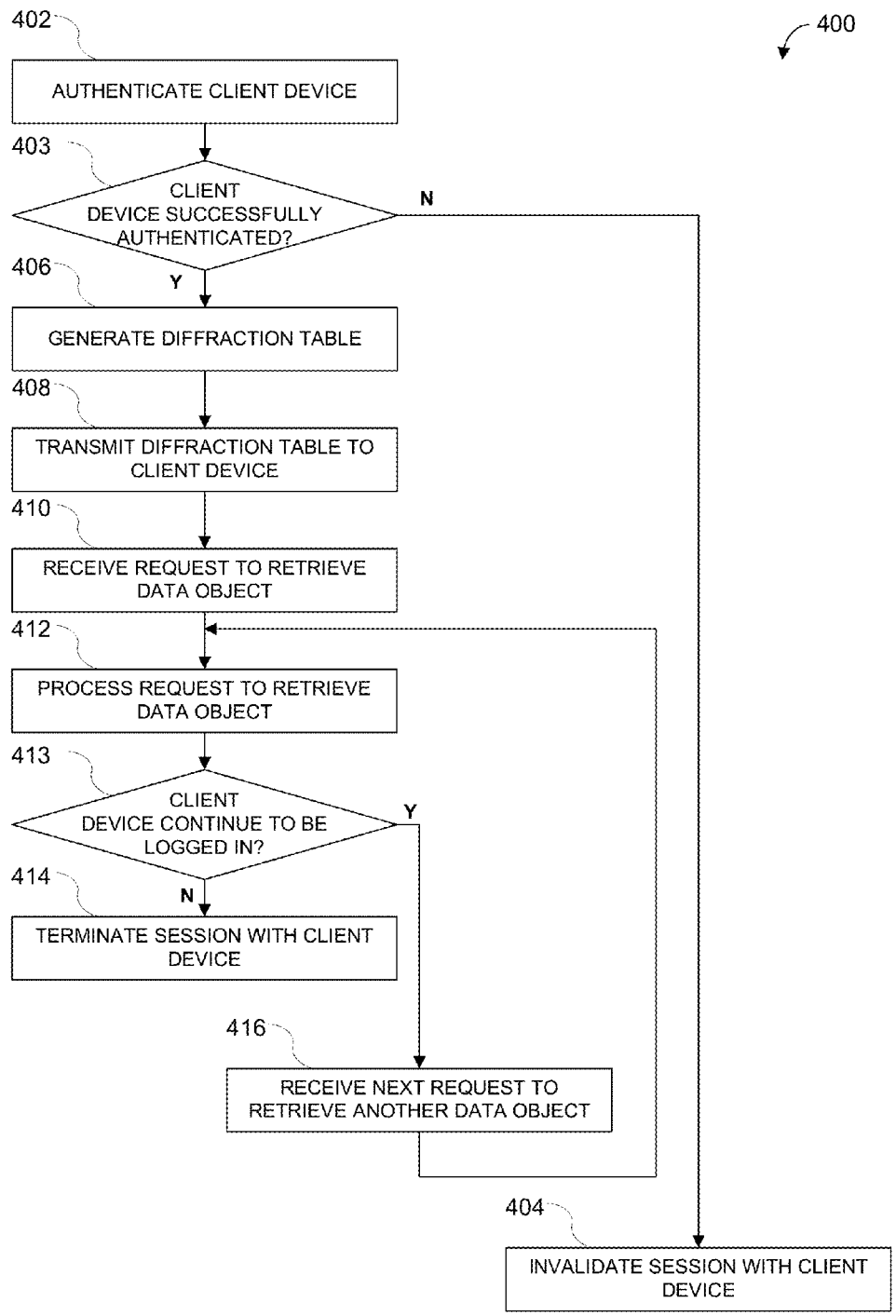
FIG. 4 is a flowchart illustrating a process for providing a data object according to various embodiments.

FIG. 4 is a flowchart illustrating a process 400 for providing a data object according to various embodiments. Referring to FIGS. 1, 2A-B, and 4, the process 400 can be performed by the initiation server 120.

The initiation server 120 authenticates the client device 110 (402). For example, in various embodiments, the initiation server 120 may authenticate the client device 110 based on a username and password. However, a person having ordinary skill in the art can appreciate that the initiation server 120 can authenticate the client device 110 in any manner without departing from the scope of the present disclosure.

If the client device 110 is not successfully authenticated (403-N), the initiation server 120 invalidates the current session with the client device 110 (404). For example, if the initiation server 120 cannot authenticate the username and/or password provided by the client device 110, the initiation server 120 may invalidate session with the client device 110 including by rejecting the attempt by the client device 110 to establish a session with the initiation server 120.

Alternately, if client device 110 is successfully authenticated (403-Y), the initiation server 120 can generate a diffraction table (406) and transmit the diffraction table to the client device 110 (408). For example, the client device 110 may generate the diffraction table 250. In various embodiments, generating the diffraction table 250 includes rotating at least a portion of connection information included in the diffraction table 250. For instance, the initiation server 120 may change at least some of the access keys provided by the diffraction table 250.

According to one exemplary embodiment, the initiation server 120 can generate the diffraction table (e.g., the diffraction table 250) each time the client device 110 is successfully authenticated and initiates a secure session with the initiation server 120. However, a person having ordinary skill in the art can appreciate that the initiation server 120 can generate the diffraction table according to a different schedule (e.g., daily) or dynamically (e.g., login, security breach) without departing from the scope of the present disclosure.

The initiation server 120 receives a request from the client device 110 to retrieve a data object (410). For example, the client device 110 may establish a secure session with the initiation server 120 upon successful authentication of the client device 110. During the secure session, the client device 110 may have access to one or more features and functionalities provided by the initiation server 120 including the retrieval of one or more data objects. The client device 110 may transmit a request to retrieve a data object to the initiation server 120 by inputting, selecting, or otherwise invoking a getData( ) command.

In response to the request to retrieve the data object, the initiation server 120 processes the request to retrieve the data object (408). In some embodiments, processing the request to retrieve the data object includes decomposing the data object into a plurality of segments and distributing the segments of the data object across a plurality of storage locations. According to one exemplary embodiment, processing the request further includes generating a sequencing key (e.g., the sequencing key 200). The initiation server 120 monitors whether the client device 110 retrieves the segments of the data object from the plurality of storage locations in the order indicated by the sequencing key (e.g., the sequencing key 200).

The initiation server 120 determines whether the client device 110 continues to be logged in (413). If the initiation server 120 determines that the client device 110 is no longer logged in (413-N), the initiation server 120 terminates the session with the client device 110 (414).

Alternately, if the initiation server 120 determines that the client device 110 continues to be logged in (413-Y), the initiation server 120 may receive a next request from the client device 110 to retrieve another data object (416). In response to receiving a request to retrieve another data object, the initiation server 120 processes the request to retrieve the data object (408).

A person having ordinary skill in the art can appreciate that one or more operations of the process 400 may be performed in a different order without departing from the scope of the present disclosure. Furthermore, it is to be understood that one or more operations of the process 400 (e.g., operation 406) may be omitted without departing from the scope of the present disclosure.

Figure 5:
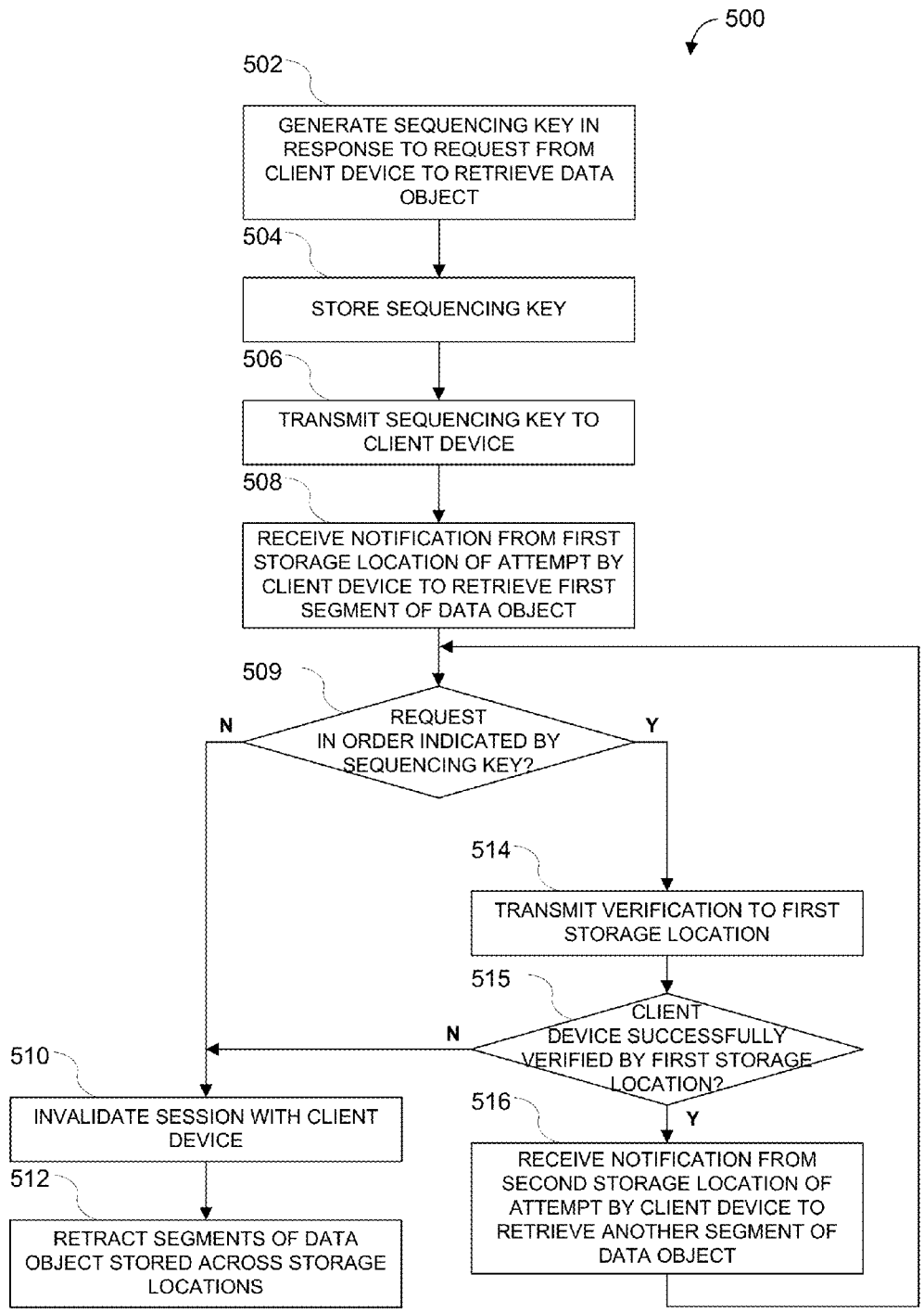
FIG. 5 is a flowchart illustrating a process for providing a data object according to various embodiments.

FIG. 5 is a flowchart illustrating a process 500 for providing a data object according to various embodiments. Referring to FIGS. 1-5, the process 500 can be performed by the initiation server 120 and can implement operation 412 of the process 400.

The initiation server 120 generates a sequencing key in response to a request from the client device 110 to retrieve a data object (502). For example, in response to the request from the client device 110 to retrieve a data object, the initiation server 120 may generate the sequencing key 200. In one exemplary embodiment, the sequencing key 200 may indicate the correct order according to which the client device 110 is required to retrieve segments of the data object, which have been distributed for storage across a plurality of storage locations including, for example, but not limited to, the first data store 140, the second data store 150, the third data store 160, and the fourth data store 170.

The initiation server 120 stores the sequencing key or a copy of the sequencing key (504). The initiation server 120 transmits the sequencing key or a copy of the sequencing key to the client device 110 (506). For example, the initiation server 120 may store the sequencing key 200 or a copy of the sequencing key 200 at a local data store (e.g., the completion table 125 or the fourth data store 170). In addition, the initiation server 120 may transmit the sequencing key 200 or a copy of the sequencing key 200 to the client device 110. According to one exemplary embodiment, the client device 110 may retrieve segments of the data object from the plurality of storage locations in the order indicated by the sequencing key 200 received from the initiation server 120. The initiation server 120 monitors the progress of the retrieval of the data object including by determining whether the client device 110 is retrieving segments of the data object in the order indicated by the sequencing key 200.

The initiation server 120 receives a notification from a first storage location of an attempt by the client device 110 to retrieve a first segment of the data object (508). In various embodiments, the first storage location may respond to a request by the client device 110 to retrieve segments of the data object by transmitting a notification of the attempt to the initiation server 120. For example, the client device 110 may attempt (e.g., based on the sequencing key 200) to retrieve one or more segments of the data object from the first data store 140. As such, the initiation server 120 may receive, from the first data store 140, a notification that the client device 110 is attempting to retrieve one or more segments of the data object from the first data store 140.

The initiation server 120 determines whether the request to retrieve segments of the data object from the first storage location is in the order indicated by the sequencing key (509). According to one exemplary embodiment, the client device 110 is required to retrieve segments of the data object from storage locations in the order indicated by the sequencing key in order to successfully retrieve the segments of the data object. For example, the sequencing key 200 indicates that segments of the data object are required to be retrieved first from the first data store 140 followed by the second data store 150, the third data store 160, the second data store 150, and the fourth data store 170. As such, the initiation server 120 may determine whether the request to retrieve segments of the data object form the first data store 140 is in the order indicated by the sequencing key 200.

The initiation server 120 may determine that the request to retrieve segments of the data object from the first storage location is not in the order indicated by the sequencing key (509-N). Accordingly, the initiation server 120 invalidates the session with the client device 110 (510). In addition, in some embodiments, the initiation server 120 may retract segments of the data object stored across the plurality of storage locations (512). For example, the initiation server 120 may determine that the client device 110 is attempting to retrieve segments of the data object from the first data store 140 while the sequencing key 200 indicates that the client device 110 is required to retrieve segments of the data object from the second data store 150. As such, the initiation server 120 may terminate the secure session with the client device 110. The initiation server 120 may further retract the segments of the data object that are stored in the first data store 140, the second data store 150, the third data store 160, and the fourth data store 170.

Alternately, the initiation server 120 may determine that the request to retrieve the segments of the data object from the first storage location is in the order indicated by the sequencing key (509-Y). In response, the initiation server 120 may transmit a verification to the first storage location (514). For example, the initiation server 120 may determine that the client device 110 is attempting to retrieve segments of the data object from the first data store 140 as indicated by the sequencing key 200. As such, the initiation server 120 may transmit to the first data store 140 a verification that the client device 110 is attempting to retrieve segments of the data object from the first data store 140 in the order indicated by the sequencing key 200.

The initiation server 120 may determine whether the client device 110 is successfully verified by the first storage location (515). In addition to retrieving segments of the data object from storage locations in the order indicated by the sequencing key, the client device 110 may be required to provide the correct access key associated with each storage location in order to successfully retrieve segments of the data object. In various embodiments, the access key for each storage location may be included in a diffraction table (e.g., the diffraction table 250) provided by the initiation server 120. For example, in response to an attempt by the client device 110 to retrieve one or more segments of the data object from the first data store 140, the first data store 140 may verify the client device 110 based on the access key provided by the client device 110. The first data store 140 may transmit to the initiation server 120 an indication of whether the first data store 140 is able to successfully verify the client device 110.

If the initiation server 120 determines that the client device 110 is not successfully verified by the first storage location (515-N), the initiation server 120 may invalidate the session with the client device 110 (510). In some embodiments, the initiation server 120 may further retract the segments of the data object stored across the plurality of storage locations (512).

For example, the initiation server 120 may determine that the client device 110 is not successfully verified by the first data store 140 if the initiation server 120 receives a notification from the first data store 140 that the client device 110 was not successfully verified based on the access key provided by the client device 110 to the first data store 140.

Alternately or in addition, the initiation server 120 may determine that the client device 110 is not successfully verified by the first data store 140 if the initiation server 120 fails to receive any notification from the first data store 140 within a threshold length period of time from when the initiation server 120 transmitted the verification that the client device 110 is retrieving segments of the data object in the order indicated by the sequencing key 200. As such, the initiation server 120 may terminate the secure session with the client device 110. The initiation server 120 may further retract segments of the data object that are stored across the first data store 140, the second data store 150, the third data store 160, and the fourth data store 170.

Alternately, the initiation server 120 may determine that the client device 110 is successfully verified by the first storage location (515-Y). For example, the initiation server 120 may receive a notification from the first data store 140 indicating that the first data store is able to successfully verify the client device 110 based on the access key provided by the client device 110. In some embodiments, the initiation server 120 may determine that the client device is successfully verified by the first data store 140 if the initiation server 120 receives the notification from the first data store 140 within a threshold period of time from when the initiation server 120 transmitted the verification that the client device 110 is retrieving segments of the data object in the order indicated by the sequencing key 200.

As such, the initiation server 120 may receive notification from a second storage location of an attempt by the client device 110 to retrieve another segment of the data object (516). For example, the client device 110 may successfully retrieve the first segment of the data object if client device 110 is successfully verified by the first storage location. As such, the client device 110 may continue to retrieve additional segments of the data object from the plurality of storage locations. For instance, the client device 110 may attempt to retrieve a second segment of the data object from the second data store 150. The initiation server 120 may determine whether the request to retrieve segments of the data object from the second storage location is in the order indicated by the sequencing key (509).

A person having ordinary skill in the art can appreciate that one or more operations of the process 500 may be performed in a different order without departing from the scope of the present disclosure.

Figure 6:
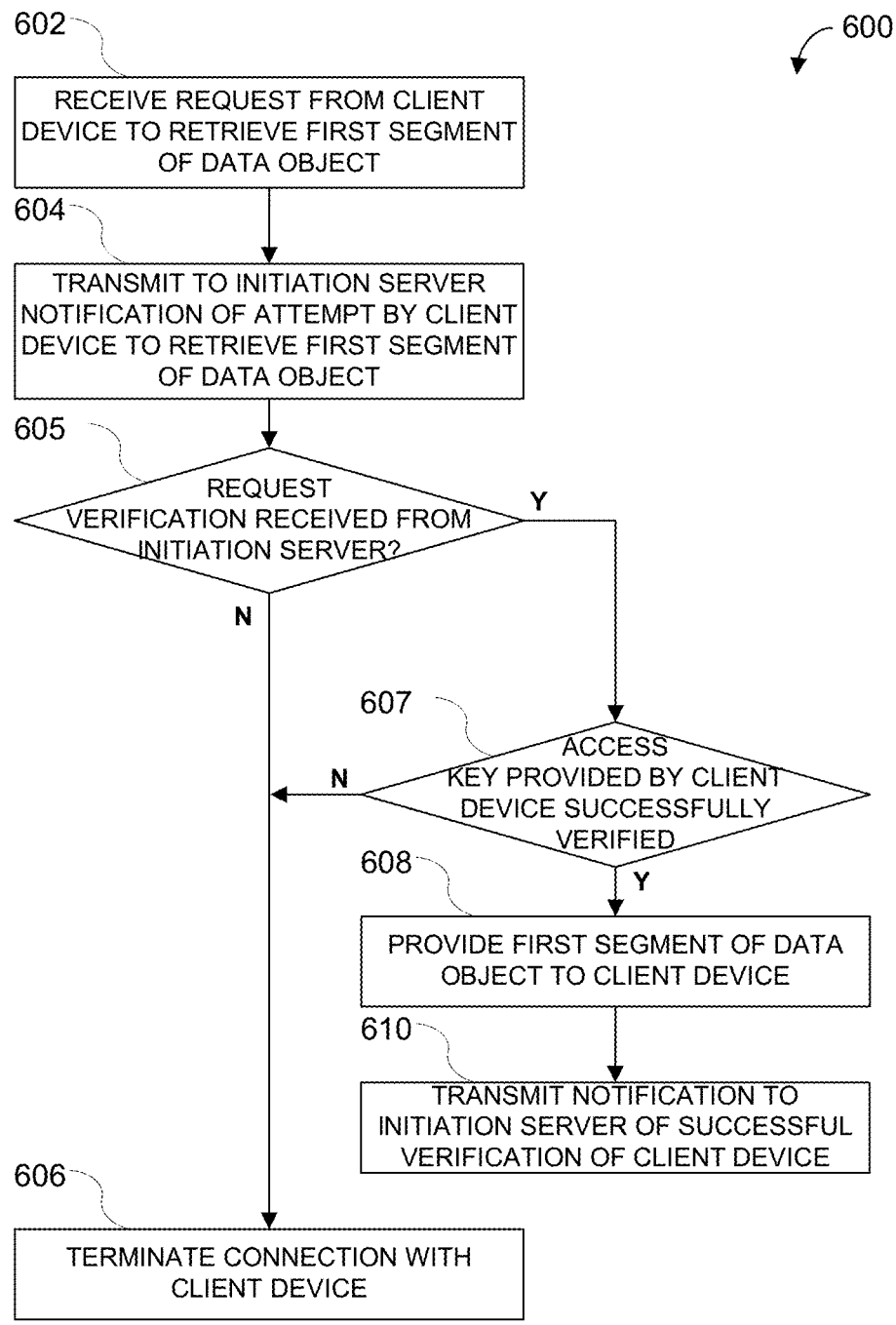
FIG. 6 is a flowchart illustrating a process for providing a data object according to various embodiments.

FIG. 6 is a flowchart illustrating a process 600 for providing a data object according to various embodiments. Referring to FIGS. 1-6, the process 600 can be performed, for example, by a storage location. The storage location may be one of a plurality of storage location including, for example, but not limited to, the first data store 140, the second data store 150, the third data store 160, the fourth data store 170, and/or the delivery server 180.

The storage location receives a request from the client device 110 to retrieve a first segment of the data object (602). In response to the request from the client device 110, the storage location transmits to the initiation server 120 a notification of the attempt by the client device 110 to retrieve the first segment of the data object (604).

For example, the client device 110 may attempt to retrieve segments of the data object from a plurality of storage locations based on the sequencing key 200 including, for example, but not limited to, the first data store 140. When the first data store 140 receives a request from the client device 110 to retrieve one or more segments of the data object, the first data store 140 may transmit a notification of the request to the initiation server 120. According to one exemplary embodiment, in response to the notification from the first data store 140, the initiation server 120 determines whether the client device 110 is retrieving segments of the data object from the plurality of data stores in the order indicated by a sequencing key (e.g., the sequencing key 200).

The storage location determines whether a verification of the request is received from the initiation server 120 (605). For example, the initiation server 120 may transmit a verification to the first data store 140 if the initiation server 120 determines that the client device 110 is retrieving segments of the data object from the plurality of data stores in the order indicated by a sequencing key (e.g., the sequencing key 200). Alternately, if the initiation server 120 determines that the client device 110 is not retrieving segments of the data object from the plurality of data stores in the order indicated by the sequencing key (e.g., the sequencing key 200), the initiation server 120 may not transmit a verification to the first data store 140 or the initiation server 120 may transmit an indication to the first data store 140 that the request by the client device 110 is not verified.

The storage location may determine that a verification of the request is not received from the initiation server 120 (605-N). For example, the first data store 140 may receive an indication from the initiation server 120 that the request by the client device 110 is not verified. Alternately, the first data store 140 may determine that the verification of the request is not received from the initiation server 120 if the first data store 140 fails to receive a verification within a threshold period of time from when the first data store 140 transmitted to the initiation server 120 the notification of the attempt by the client device to retrieve the first segment of the data object. As such, the storage location may terminate the connection with the client device 110 (606).

Alternately, if the storage location determines that a verification of the request is received from the initiation server 120 (605-Y), the storage location may verify the access key provided by the client device 110 (607). For example, the client device 110 may provide an access key for the first data store 140 when requesting to retrieve the first segment of the data object from the first data store 140. The access key for the first data store 140 may be included in a diffraction table (e.g., the diffraction table 250) provided to the client device 110 by the initiation server 120. In various embodiments, the access key for the first data store 140 may be generated based on tokens specific to the first data store 140 and/or the client device 110.

If the storage location does not successfully verify the access key provided by the client device 110 (607-N), the storage location terminates the connection with the client device 110 (606). Alternately, if the storage location successfully verifies the access key provided by the client device 110 (607-Y), the storage location provides the first segment of the data object to the client device 110 (608).

The storage location transmits a notification to the initiation server 120 of the successful verification of the client device 110 (610). In one exemplary embodiment, the initiation server 120 monitors the progress of the retrieval of the data object by the client device 110. The initiation server 120 may maintain a secure session with the client device 110 and allow the client device 110 to continue retrieving additional segments of the data object from the plurality of storage locations if the client device 110 is successfully verified by the first data store 140 based on the access key provided by the client device 110. Alternately, the initiation server 120 may terminate the secure session with the client device 110 if the initiation server 120 determines that the client device 110 failed to be successfully verified by the first data store 140.

It is to be understood that at least some operations of the process 600 may be performed concurrently (or in sequence) without departing from the scope of the present disclosure. A person having ordinary skill in the art can appreciate that one or more operations of the process 600 may be performed in a different order without departing from the scope of the present disclosure.

Figure 7:
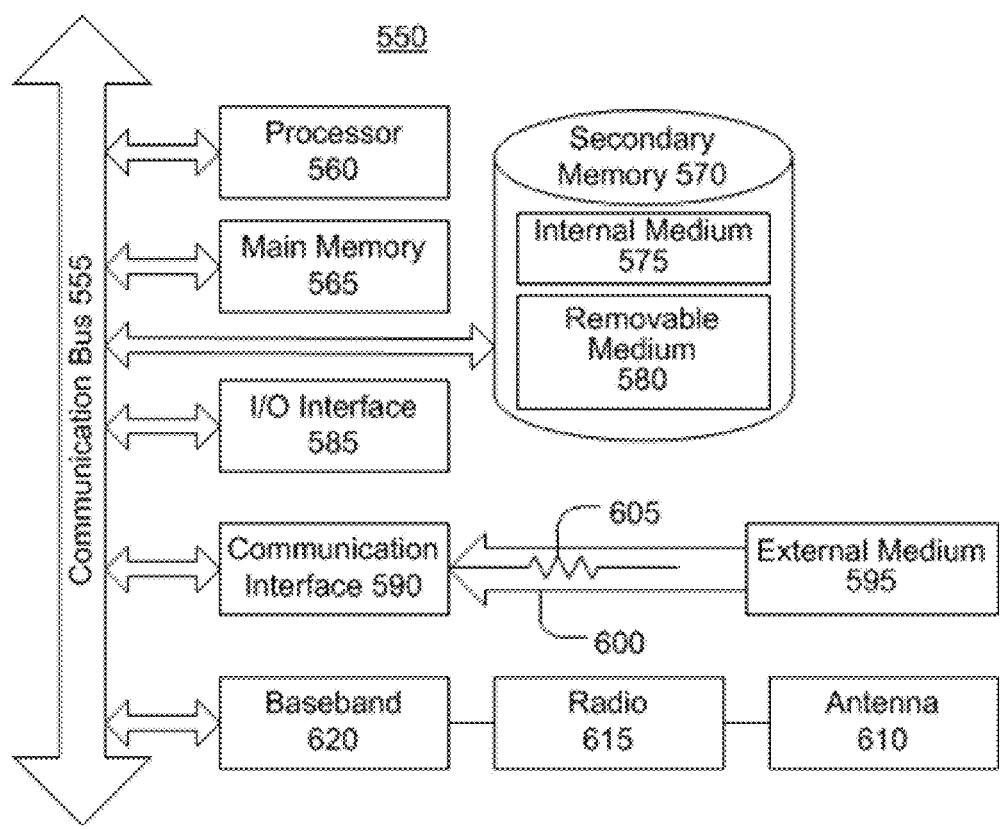
FIG. 7 is a block diagram illustrating wired or wireless system according to various embodiments.

FIG. 7 is a block diagram illustrating wired or wireless system 550 according to various embodiments. Referring to FIGS. 1 and 7, the system 550 may be used to implement the client device 110, the initiation server 120, and/or the delivery server 180.

In various embodiments, the system 550 can be a conventional personal computer, computer server, personal digital assistant, smart phone, tablet computer, or any other processor enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 550 preferably includes a main memory 565 and may also include a secondary memory 570. The main memory 565 provides storage of instructions and data for programs executing on the processor 560. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include an internal memory 575 and/or a removable storage medium 580, for example a floppy disk drive, a magnetic tape drive, a compact disc ("CD") drive, a digital versatile disc ("DVD") drive, etc. The removable storage medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the system 550 for execution by the processor 560.

In alternative embodiments, the secondary memory 570 may include other similar means for allowing computer programs or other data or instructions to be loaded into the system 550. Such means may include, for example, an external storage medium 595 and a communication interface 590. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are the removable storage medium 580 and a communication interface, which allow software and data to be transferred from an external storage medium 595 to the system 550.

System 550 may also include an input/output ("I/O") interface 585. The I/O interface 585 facilitates input from and output to external devices. For example the I/O interface 585 may receive input from a keyboard or mouse and may provide output to a display. The I/O interface 585 is capable of facilitating input from and output to various alternative types of human interface and machine interface devices alike.

System 550 may also include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. The electrical communication signals 605 are preferably provided to communication interface 590 via a communication channel 600. In one embodiment, the communication channel 600 may be a wired or wireless network, or any variety of other communication links. Communication channel 600 carries the electrical communication signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable storage medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable storage medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The processor 560 has access to one or more data storage areas including, for example, but not limited to, the main memory 565 and the secondary memory 570. The processor 560 is preferably configured to execute instructions (i.e., computer programs or software) that can be stored in the main memory 565 or in the secondary memory 570. Computer programs can also be received from the baseband processor 610 and stored in the main memory 565 or in the secondary memory 570, or executed upon receipt. Such computer programs, when executed, enable the system 550 to perform the various functions of the present invention as previously described. For example, the main memory 565 may include various software modules (not shown) that are executable by processor 560.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method for storing and retrieving a data object, the method comprising:
   dissociating a user profile from sections of the data object that include other information,
   disassembling the user profile into a plurality of separate pieces of identity information;
   individually encrypting each of the plurality of separate pieces of identity information comprising the user profile using a separate encryption key for each of the separate pieces of identity information;
   storing the separate pieces of identity information across a plurality of storage locations;
   transmitting from a client device to an initiation server a request to retrieve the data object, wherein the data object comprises a plurality of segments stored across the plurality of storage locations;
   receiving, at the client device, a sequencing key from the initiation server in response to the request to retrieve the data object, wherein the sequencing key comprises an ordered list of the plurality of storage locations;
   retrieving, by the client device, the plurality of segments of the data object from the plurality of storage locations at least in part according to the order indicated by the sequencing key, wherein the order indicated by the sequencing key comprises retrieving a first segment of the data object from a first storage location prior to retrieving a second segment of the data object from a second storage location;
   monitoring a progress of the retrieval of the data object by the client device, wherein said monitoring comprises:
      receiving, at the initiation server, a notification from the second storage location of the plurality of storage locations of an attempt by the client device to retrieve the second segment of the data object, and determine whether a request to retrieve the second segment of the data object from the second storage location is in accordance with the order indicated by the sequencing key; and terminating a session with the client device in response to determining that the request to retrieve the second segment of the data object from the second storage location is not in the order indicated by the sequencing key, wherein said determination comprises determining that the client device is attempting to retrieve the second segment of the data object from the second storage location prior to retrieving the first segment of the data object from the first storage location.

2. The method of claim 1, wherein the ordered list comprises a first identifier associated with the first storage location followed by a second identifier associated with the second storage location.

3. The method of claim 1, further comprising receiving a diffraction table from the initiation server.

4. The method of claim 3, wherein the plurality of segments of the data object is retrieved from the plurality of storage locations further based on the diffraction table.

5. The method of claim 4, wherein the diffraction table includes, for each of the plurality of storage locations, a corresponding universal record locator (URL), port number, and access key.

6. The method of claim 5, wherein the access key associated with the first storage location of the plurality of storage locations is generated based at least in part on a token associated with the first storage location and a token associated with the client device.

7. The method of claim 5, further comprising providing the access key associated with the first storage location of the plurality of storage locations to retrieve a first segment of the data object from the first storage location.

8. The method of claim 7, wherein the first storage location is configured to provide the first segment of the data object to the client device in response to successfully verifying the client device based on the access key provided by the client device.

9. A method for providing a data object, the method comprising:
dissociating a user profile from sections of the data object that include other information,
disassembling the user profile into a plurality of separate pieces of identity information; and
individually encrypting each of the plurality of separate pieces of identity information comprising the user profile using a separate encryption key for each of the separate pieces of identity information;
storing the separate pieces of identity information across a plurality of storage locations;
receiving, at an initiation server, a request from a client device to retrieve a data object;
generating a sequencing key in response to the request from the client device to retrieve the data object, wherein the sequencing key comprises an ordered list of the plurality of storage locations;
transmitting the sequencing key to the client device;
monitoring a progress of the retrieval of the data object by the client device, wherein said monitoring comprises:
receiving a notification from a first storage location of the plurality of storage locations of an attempt by the client device to retrieve a first segment of the data object, and
determining whether the request to retrieve the first segment of the data object from the first storage location is in accordance with the order indicated by the sequencing key, wherein the order indicated by the sequencing key comprises retrieving a second segment of the data object from a second storage location prior to retrieving the first segment of the data object from the first storage location; and
invalidating a session with the client device in response to determining that the request to retrieve the first segment of the data object from the first storage location is not in the order indicated by the sequencing key, wherein said determination comprises determining that the request to retrieve the first segment of the data object from the first storage location is prior to retrieving the second segment of the data object from the second storage location.

10. The method of claim 9, further comprising retracting the plurality of segments of the data object from the plurality of storage locations in response to determining that the request to retrieve the first segment of the data object from the first storage location is not in the order indicated by the sequencing key.

11. The method of claim 9, further comprising transmitting a verification to the first storage location in response to determining that the request to retrieve the first segment of the data object from the first storage location is in the order indicated by the sequencing key.

12. The method of claim 11, wherein the first storage location is configured to provide the first segment of the data object to the client device in response to receiving the verification from the initiation server and to successfully verifying the client device based on an access key provided by the client device.

13. The method of claim 9, further comprising:
authenticating the client device; and
in response to successfully authenticating the client device:
generating a diffraction table that includes, for each of the plurality of storage locations, a universal record locator (URL), a port number, and an access key; and
transmitting the diffraction table to the client device.

14. A method of providing a data object, the method comprising:
dissociating a user profile from sections of the data object that include other information,
disassembling the user profile into a plurality of separate pieces of identity information;
individually encrypting each of the plurality of separate pieces of identity information comprising the user profile using a separate encryption key for each of the separate pieces of identity information;
storing the separate pieces of identity information across a plurality of storage locations;
receiving, at a second storage location of the plurality of storage locations, a request from a client device to retrieve a second segment of the plurality of segments of the data object, wherein the data object comprises the plurality of segments stored across the plurality of storage locations;
transmitting, from the second storage location to the initiation server, a notification of the attempt by the client device to retrieve the second segment of the data object;
monitoring, by the initiation server, a progress of the retrieval of the data object by the client device, said monitoring comprises:

receiving the notification of the attempt by the client device to retrieve the second segment of the data object, and determining whether the request to retrieve the second segment of the data object from the second storage location is in accordance with an order indicated by a sequencing key, wherein the order indicated by the sequencing key comprises retrieving a first segment of the data object from a first storage location prior to retrieving the second segment of the data object from the second storage location;

receiving a verification of the request in response to determining, by the initiation server, that the client device requested to retrieve a first segment of the data object from a first storage location prior to requesting to retrieve the second segment of the data object from the second storage location in accordance with the order indicated by the sequencing key;

determining whether the verification of the request is received from the initiation server;

in response to determining that a verification of the request is received from the initiation server:
verifying an access key provided by the client device; and
providing the second segment of the data object to the client device in response to successfully verifying the access key provided by the client device; and invalidating a session with the client device in response to determining that the request to retrieve the second segment of the data object from the second storage location is not in the order indicated by the sequencing key, wherein said determination comprises determining that the client device is requesting to retrieve the second segment of the data object from the second storage location prior to requesting to retrieve the first segment of the data object from the first storage location.

15. The method of claim 14, further comprising in response to successfully verifying the access key provided by the client device, transmitting a notification to the initiation server of a successful verification of the client device.

16. The method of claim 14, further comprising terminating a connection with the client device in response to determining that a verification of the request is not received from the initiation server.

17. The method of claim 14, wherein the initiation server is further configured to provide the access key for the first storage location in a diffraction table.

18. The method of claim 17, the diffraction table includes, for each of the plurality of storage locations, a corresponding universal record locator (URL), port number, and access key.

19. A system for diffracted data retrieval (DDR), the system comprising:
a plurality of storage locations;
a client device configured to:
transmit a request to retrieve a data object, wherein the data object comprises a plurality of segments stored across the plurality of storage locations;
receive a sequencing key in response to the request to retrieve the data object, wherein the sequencing key comprises an ordered list of the plurality of storage locations, and wherein the order indicated by the sequencing key comprises retrieving a first segment of the data object from a first storage location prior to retrieving a second segment of the data object from a second storage location; and retrieve the plurality of segments of the data object from the plurality of storage locations at least in part according to the order indicated by the sequencing key; and an initiation server configured to:
dissociate a user profile from sections of a data object that include other information,
disassemble the user profile into a plurality of separate pieces of identity information; and
individually encrypt each of the plurality of separate pieces of identity information comprising the user profile using a separate encryption key for each of the separate pieces of identity information;
store the separate pieces of identity information across the plurality of storage locations;
receive the request from the client device to retrieve the data object;
generate the sequencing key in response to the request from the client device to retrieve the data object;
transmit the sequencing key to the client device;
monitor a progress of the retrieval of the data object by the client device, wherein to monitor the progress comprises:
receive a notification from the second storage location of the plurality of storage locations of an attempt by the client device to retrieve the second segment of the data object, and
determine whether the request to retrieve the second segment of the data object from the second storage location is in accordance with the order indicated by the sequencing key; and
invalidate a session with the client device in response to determining that the request to retrieve the second segment of the data object from the second storage location is not in the order indicated by the sequencing key, wherein said determination comprises determining that the client device is attempting to retrieve the second segment of the data object from the second storage location prior to retrieving the first segment of the data object from the first storage location.

20. The system of claim 19, wherein the first storage location of the plurality of storage location is configured to:
receive a request from the client device to retrieve the first segment of a plurality of segments of the data object;
transmit, to the initiation server, a notification of the attempt by the client device to retrieve the first segment of the data object;
determine whether a verification of the request is received from the initiation server; and
in response to determining that a verification of the request is received from the initiation server:
verify an access key provided by the client device; and
provide the first segment of the data object to the client device in response to successfully verifying the access key provided by the client device.

21. The system of claim 20, wherein the first storage location is further configured to transmit to the initiation server a notification of a successful verification of the client device.

22. The system of claim 21, wherein the initiation server is further configured to invalidate the session with the client device in response to determining that the client device is not successfully verified by the first storage location.

* * * * *